United States Patent
Frost

(10) Patent No.: US 9,399,554 B2
(45) Date of Patent: Jul. 26, 2016

(54) HIGH LOAD CONVEYOR CHAIN AND METHOD

(71) Applicant: Charles C. Frost, Ada, MI (US)

(72) Inventor: Charles C. Frost, Ada, MI (US)

(73) Assignee: Frost Tech LLC, Grand Rapids, MI (US)

( * ) Notice: Subject to any disclaimer, the term of this patent is extended or adjusted under 35 U.S.C. 154(b) by 60 days.

(21) Appl. No.: 14/073,201

(22) Filed: Nov. 6, 2013

(65) Prior Publication Data

US 2014/0174892 A1 Jun. 26, 2014

Related U.S. Application Data

(60) Provisional application No. 61/723,482, filed on Nov. 7, 2012.

(51) Int. Cl.
| | |
|---|---|
| *B65G 17/38* | (2006.01) |
| *B65G 17/06* | (2006.01) |
| *B65G 17/20* | (2006.01) |

(52) U.S. Cl.
CPC .............. *B65G 17/06* (2013.01); *B65G 17/20* (2013.01)

(58) Field of Classification Search
CPC ........ B65G 17/38; B65G 17/20; B65G 45/08; F16G 13/06; B61B 10/02; B61B 10/022
USPC .................. 198/850–853; 474/156, 230, 223; 104/172.4
See application file for complete search history.

(56) References Cited

U.S. PATENT DOCUMENTS

| | | | |
|---|---|---|---|
| 2,162,042 A | 6/1939 | Welser | |
| 3,011,356 A | 12/1961 | Bowman | |
| 3,774,546 A | 11/1973 | Krammer | |
| 4,493,680 A * | 1/1985 | Hoffmann | 474/230 |
| 5,305,872 A * | 4/1994 | Hutton | 198/853 |
| 5,966,123 A * | 10/1999 | Kaplan | 715/747 |
| 6,991,094 B2 * | 1/2006 | Frost | 198/853 |
| 7,726,469 B2 * | 6/2010 | Frost et al. | 198/851 |
| 2003/0029701 A1 * | 2/2003 | Sykora | 198/853 |

FOREIGN PATENT DOCUMENTS

WO 2014074594 5/2014

OTHER PUBLICATIONS

Cema Standard No. 601-1995, "Overhead Trolley Chain Conveyors," Conveyor Equipment Manufacturers Association pp. III-5-III-8; IV-21, 22.

* cited by examiner

*Primary Examiner* — James R Bidwell
(74) *Attorney, Agent, or Firm* — Mitchell Intellectual Property Law, PLLC

(57) ABSTRACT

An overhead conveyor, components therefor and method for making same, in which the conveyor chain has a nominal pitch "X," bit a maximum allowable chain pull value which is equal to or greater than the maximum allowable chain pull value for a chain having a nominal pitch of X+1. Trolleys can be attached to the chain at intervals which differ from the intervals of a chain with pitch of X+1. Fewer synchronized drives are required for driving longer chains. A lower pitch chain can be used to drive larger trolleys, without sacrificing the maximum allowable chain pull value always used in conjunction with the larger trolley.

11 Claims, 3 Drawing Sheets

HIGH LOAD CONVEYOR CHAIN AND METHOD

CLAIM OF PRIORITY

This application claims priority to U.S. Provisional Application Ser. No. 61/723,482, filed Nov. 7, 2012, entitled HIGH LOAD CONVEYOR CHAIN AND METHOD.

FIELD AND BACKGROUND OF THE INVENTION

The present invention relates to overhead conveyors, which typically comprise at least an "I beam" track, trolleys which have opposed wheels engaging the bottom flanges of said I beam track on opposite sides of the center web of the beam, and a driven conveyor chain connected to said trolleys at spaced intervals. The chains usually comprise center links alternating with a pair of side links, which overlap the end of the center link on the opposite, sides thereof, and are joined to the center link by a pin passing through the overlapping ends of the side links and center links.

In accordance with long standing industry practice, the links of said chains come in lengths giving them a nominal 2 inch, 3 inch, 4 inch or 6 inch pitch dimension. The pitch is the distance between the centers of adjacent pins, and is referred to as nominal, as the pitch is typically $\frac{1}{16}$ of an inch more than the nominal number. The actual length of each chain link is long enough to provide for the overlap, and leave the nominal pitch dimension as indicated. Chains are identified in part by their pitch. Thus a chain with a two inch pitch is referred to as a 2 inch chain, and so or By industry standard, a 2 inch chain uses pins which are $\frac{2}{8}$ ($\frac{1}{4}$) inch pins which are $\frac{4}{8}$ ($\frac{1}{2}$) inch in diameter, and is more specifically identified as an X 348 chain. These and other dimensions for 2, 3, 4 and 6 inch chains are set forth in Table 1, with dimension "F" being the pin diameter. The other dimensions, A, B, C, etc listed in Table 1 are indicated in FIGS. 1 and 2. These are industry standards established through years of practice, and are set forth in the publications of the Conveyor Equipment Manufacturers Association (CEMA).

nominal height of the beam track they are carried on. The actual diameter is slightly less than the actual height of the I beam, so there is no binding of the trolley wheel between the lower beam flange and the upper beam flange. Thus a trolley with a nominal wheel diameter of 2 inches is used on a nominal 2 inch beam, a nominal 3 inch diameter wheel trolley is used on a nominal 3 inch beam, a 4 on a 4, and a 6 on to 6.

Further, chains made to the various pitches are by practice and industry standard fashioned and manufactured to dimensions and pin sizes which cause the chain to have industry specified maximum allowable "chain pull loads." Chain pull load refers to the load placed on the chain as it pulls its associated trolleys and any loads they are carrying. Thus, a 3 inch chain has a maximum allowable chain pull load of 1500 pounds. For a 4 inch chain it is 3000 pounds, and for a six inch chain, 5500 pounds.

Trolleys are referred to by their nominal wheel diameter, which by industry standard and practice corresponds to the nominal beam height. The drive chain is driven by one or more drives. Multiple drives must be synchronized, and are used to make sure the maximum chain pull load for the chain is not exceeded in any portion thereof.

SUMMARY OF THE INVENTION

The present invention comprises an overhead conveyor, components therefor and method for making same, in which the conveyor chain has a nominal pitch "X," but a maximum allowable chain pull value which is equal to or greater than the maximum allowable chain pull value for a chain having a nominal pitch of X+1.

In a more preferred embodiment, the conveyor chain has a pitch which is less than the nominal height of the beam on which it is carried, but has a maximum allowable chain pull value which is equal to or greater than that of a chain having a pitch equal to or greater than the height of the beam.

This invention facilitates hitherto unappreciated advantages. For one, trolleys can be attached to said chain at intervals which differ from the intervals of a chain with pitch corresponding to the nominal height of the beam. Another is that fewer synchronized drives are required for driving longer

| Chain | A | B | C max | D | E max | F | G min | H min | I min |
|---|---|---|---|---|---|---|---|---|---|
| X-228 | 2 | $\frac{15}{32}$ | $\frac{11}{16}$ | $\frac{3}{8}$ | $1\frac{1}{8}$ | $\frac{1}{4}$ | $\frac{53}{64}$ | $1\frac{1}{16}$ | $\frac{5}{16}$ |
| X-50-6 | (50) | (11.90) | (17.46) | (9.53) | (28.57) | (6.35) | (21.03) | (26.98) | (7.94) |
| X-348 | 3 | $\frac{3}{4}$ | $1\frac{3}{32}$ | $\frac{1}{2}$ | $1\frac{27}{32}$ | $\frac{1}{2}$ | $1\frac{9}{32}$ | $1\frac{5}{8}$ | $\frac{9}{16}$ |
| X-75-13 | (75) | (19.05) | (27.78) | (12.70) | (46.83) | (12.70) | (32.54) | (41.27) | (14.28) |
| X-458 | 4 | 1 | $1\frac{13}{32}$ | $\frac{5}{8}$ | $2\frac{1}{4}$ | $\frac{5}{8}$ | $1\frac{5}{8}$ | $2\frac{1}{4}$ | $\frac{11}{16}$ |
| X-100-16 | (100) | (25.4) | (35.71) | (15.87) | (57.15) | (15.87) | (41.27) | (57.15) | (17.46) |
| X-678 | 6 | $1\frac{9}{32}$ | 2 | $\frac{13}{16}$ | 3-118 | $\frac{7}{8}$ | $2\frac{1}{4}$ | 3-318 | $\frac{31}{32}$ |
| X-150-22 | (150) | (32.50) | (50.80) | (20.63) | (79.37) | (22.22) | (57.15) | (85.72) | (24.61) |

Trolleys are connected to the driven chains by a depending leg which passes through the opening in a center link. Thus, trolleys can be spaced as close as nominally 4 inches for a two inch chain, or in multiples thereof. For a three inch chain, the spacing would be six inches or multiples thereof, for a four inch, eight inches or multiples and for a six inch, 12 inches or multiples thereof.

Also by industry standards and practice, the pitch of the chain used matches the nominal height of the I beam track used. The height of the beam may be higher than its nominal value, e.g. the actual height of a 2 inch beam is $2\frac{5}{8}$ inches. Also by industry standard and practice, trolleys are referred to by their nominal wheel diameter, which corresponds to the chains. Yet another is that a lower pitch chain can be used to drive larger trolleys, without sacrificing the maximum allowable chain pull value always used in conjunction with the larger trolley. Thus for example a 2 inch chain can drive 3 inch trolleys, with the same maximum allowable chain pull value provided by a 3 inch chain.

DETAILED DESCRIPTION OF THE PREFERRED EMBODIMENT

Figure 1:
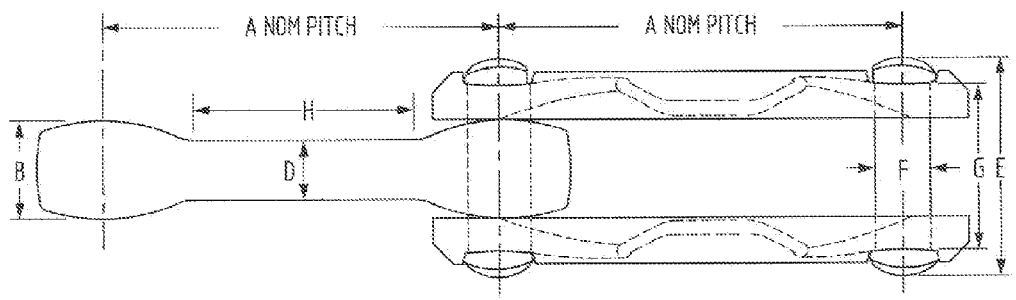
FIG. 1 is a side elevational view of a chain segment identify dimensions provided in Table 1.
Figure 2:
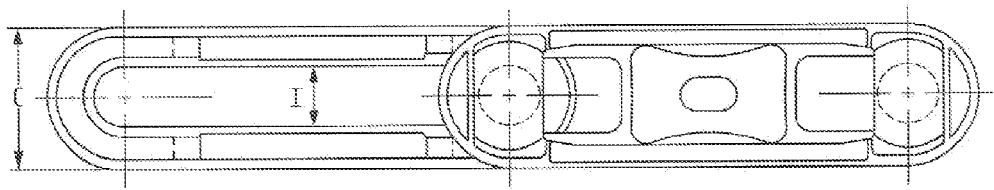
FIG. 2 is a top plan view of a chain segment identifying dimensions provided in Table 1.
Figure 3:
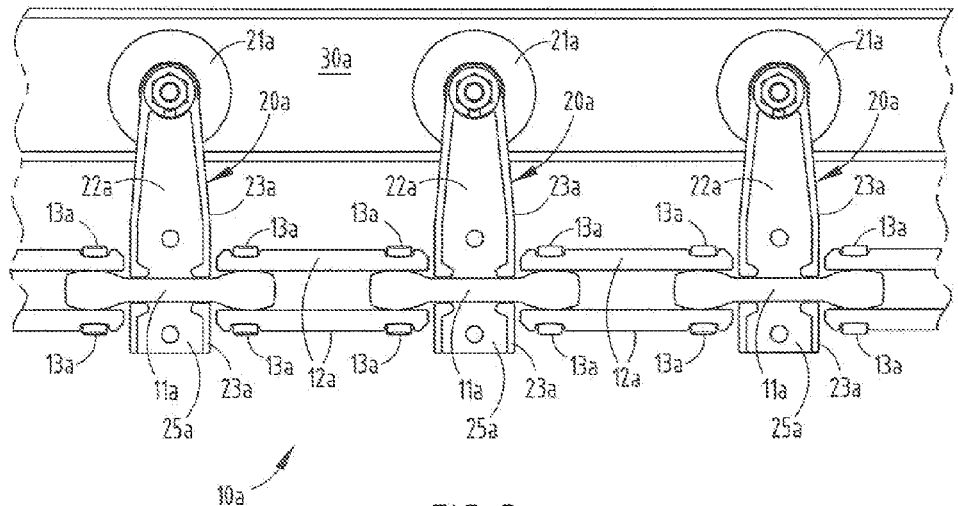
FIG. 3 is a side elevational view of a three inch beam carrying a three inch chain with trolleys spaced at six inches.
Figure 4:
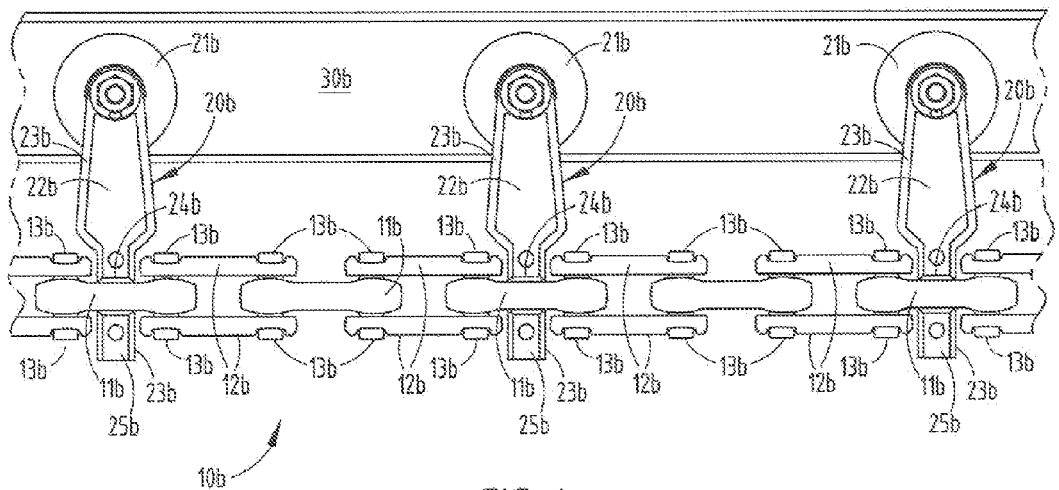
FIG. 4 is a side devotional view of a three inch beam carrying, a two inch chain of strength comparable that of a three inch chain, with trolleys spaced at eight inches.
Figure 5A:
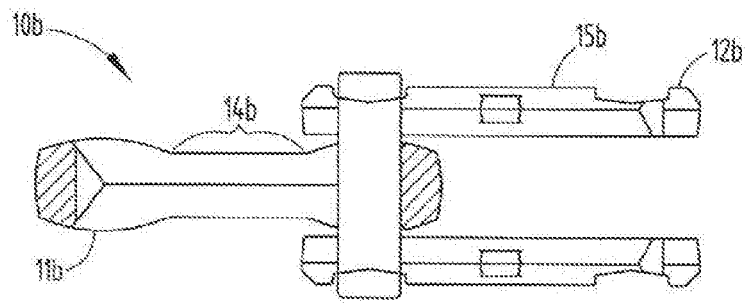
FIG. 5A is a side devotional view of the adjoining links and pin for a two inch chain having the strength of a three inch chain.
Figure 5B:
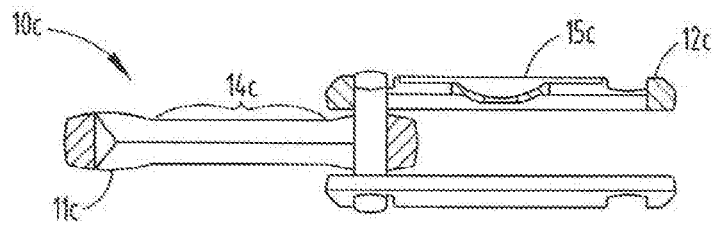
FIG. 5B is a side elevational view of the adjoining links and a pin for a conventional two inch chain.
Figure 6A:
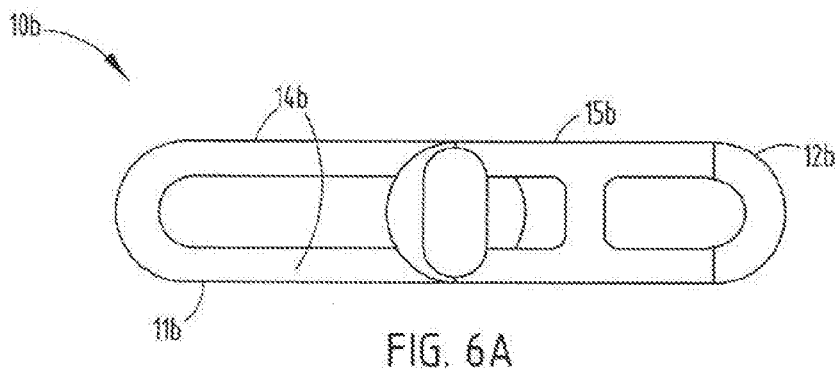
FIG. 6A is a top plan view of the adjoining links of FIG. 5A.
Figure 6B:
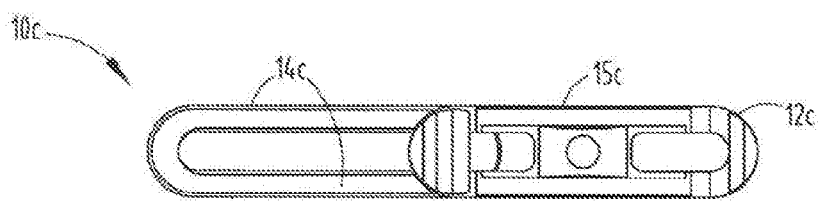
FIG. 6B is a top plan view of the adjoining links of FIG. 5B.

The present invention is illustrated in the preferred embodiment by comparing a prior an 3 inch chain 10a driving 3 inch trolleys 20a on a 3 inch beam 30a (FIG. 3), to a 2 inch chain 10b driving 3 inch trolleys 20b on a 3 inch beam 30a (FIG. 4). Each chain has center links 11a or 11b respectively, joined by pairs of side links 12a or 12b. The adjacent links are joined by pins 13a and 13b respectively. One of the advantages of the present invention is that by using a 2 inch chain 10b with the strength of the 3 inch chain 10a or greater, one can achieve the same or greater maximum allowable chain pull load while giving the operator greater flexibility in trolley spacing. For the 3 inch chain shown in FIG. 3, an operator must space his trolleys at 6, 12, 18, 24 inches, etc. In contrast, an operator using a 2 inch chain of the present invention enjoys the same maximum allowable chain pull load as the operator using a 3 inch chain, but can space the trolley, 20b as close as 4 inches, or at multiples thereof. While a 6 inch spacing might be too close for the operator's proposed use, is 12 inch spacing may simply waste space, and require a higher chain speed to achieve the desired level of productivity. By using a 2 inch chain in accordance with the present invention, the operator can use a spacing of 8 inches, rather than 6 inches, without sacrificing maximum allowable chain pull load, merely by securing a trolley to every other center link as shown in FIG. 4. The same level of productivity can be achieved using a proportionally lower chain speed.

In the preferred embodiment shown, the 2 inch chain 10b is given the strength of the 3 inch chain 10a by:

1. Utilizing a ½ inch pin instead of a ¼ inch pin, and
2. By utilizing 2 inch pitch links which are thicker in material cross section than those of a prior art 2 inch pitch chain.

See FIGS. 5A, 5B, 6A and 6B. To reflect the difference in pin diameter, the preferred embodiment 2 inch chain 10b is identified more specifically as an X-248 chain, rather than as a prior art X-228 chain. The pins used in the 3 and 4 inch preferred embodiment chains would have diameters of ⅝ and ⅞, and would be more specifically identified as X-358 and X 478 chains, rather than conventional X-348 and X-458.

The center links 11b of the preferred embodiment 2 inch chain 10b have spaced side legs 14b with a height of 0.5 inch as compared to 0.3 inch for the leg portion 14c of a center link 11c of prior art 2 inch chain 10c. Preferably the center link legs in all of the preferred embodiment chains are 50-75% taller than their corresponding prior art counterparts, i.e. industry standard center links for chains of the same pitch. Similarly, the thickness of the leg portions 14b of center link 11b are 0.26 inch as compared to 0.19 inch thickness for the legs 14c of a prior art 2 inch chain 10c. Preferably, the center link legs in all of the preferred embodiment chains are 25-50% thicker than their prior art industry standard counterparts. The corresponding dimensions for spaced legs 15b and 15c of the side links 12b and 12c are:

Heights 0.26 inch versus 0.19 inch; and

Thicknesses 0.35 inch versus 0.25 inch.

Preferably the side link legs in all of the preferred embodiment chains are 25-50% taller, and 25-50% thicker than their corresponding prior art counterparts. Other measures can be taken to farther strengthen the 2 inch chain 10b of the preferred embodiment. In a similar manner, the dimensions of the links used in the 3 and 4 inch chants of the preferred embodiment chains are larger in similar proportions than those of corresponding, prior art 3 and 4 inch chains.

The trolleys 20a and 20b shown in FIGS. 3 and 4 have a pair of wheels 21a and 21b respectively, each wheel being oriented on an opposite of its respective beam 30a. A pair of arms 22a and 22b respectively extend downwardly, one from each of the opposed wheels 21a or 21b. Arms 22a and 22b respectively extend downwardly and then inwardly towards one another, and then downwardly again to define downwardly depending legs 25a and 25b. The legs 25a and 25b pass through the openings in the respective center links 11a and 11b. A downwardly depending working attachment (not shown) may be secured between said legs 25. The working attachment might be a hook for hanging material to convey, or a pusher for pushing free trolleys on a lower track, or some other device.

Leg 25b of trolley 20b is slightly narrower than leg 25a of trolley 20a. This allows leg 25b to fit within the smaller opening of a 2 inch center link, as compared to the opening of the 3 inch center link 11a. Further while the arms and legs 22 and 25 of both trolleys 20a and 20b both have ribs 23a or 23b running along the respective edges thereof, trolley 20b includes an additional rib 24b extending between the two ribs 23b, located so as to be adjacent the top and bottom of the leg of center link 11b (compare FIG. 4 to FIG. 3). This gives greater strength to the narrower leg 25b of trolley 20b. No such joining rib 24 is used in the trolleys 20a.

The benefits of the present invention have not at all been recognized or thought of by prior artisans. The use of a 2 inch chain with the strength of a 3 inch chain or more gives an operator greater flexibility in spacing the trolleys used, without sacrificing maximum allowable chain pull load. The same is true for using a 3 inch chain instead of a 4, or a 4 instead of a 5. This not only maximizes chain capacity, but also allows one to use slower chain speeds. If the trolleys and their loads have to be farther apart, the chain must move faster in order to meet production requirements. Closer spacing allows for slower chain speeds to meet the same production requirements. Using the chains at lower speeds causes less wear and tear on the chains, and avoids other problems as well. 100 to 130 feet a minute is about as fast as the chains can be comfortably operated.

Another advantage is that the higher maximum chain pull value makes possible the use of fewer synchronized drives to drive the chain. Yet another is that a lower pitch chain can be used to drive larger trolleys, without sacrificing the maximum allowable chain pull value always used in conjunction with the larger trolley. Thus for example, a 2 inch chain can drive 3 inch trolleys, with the same maximum allowable chain pull value provided by a 3 inch chain.

These and other objects, advantages and features of the present invention will be understood and appreciated by those of ordinary skill in the art.

The invention claimed is:

1. An overhead conveyor chain having a nominal pitch of "X" inches, with a maximum allowable chain pull value which is equal to or greater than the maximum allowable chain pull value for a chain having a nominal pitch of X+1 inches; said conveyor chain having pairs of spaced side links joining alternating center links, in which said center links have spaced center link legs which are 50-75% taller in a direction perpendicular to the length of the chain, and 25-50% thicker, than the center link legs of industry standard chains having the same pitch; and said side links have spaced legs which are 25-50% taller in a direction perpendicular to the length of the chain, and 25-50% thicker, than the side link legs of industry standard chains having the same pitch; said nominal pitch being 2 inches, and said side links and center links being joined by ½ inch diameter pins.

2. The overhead conveyor chain of claim 1, with said nominal pitch being 3 inches, and said side links and said center links being joined by ⅝ inch diameter pins.

3. The overhead conveyor chain of claim 1, with said nominal pitch being 4 inches, and said side links and said center links being joined by ⅞ inch diameter pins.

4. An overhead conveyor comprising: a driven conveyor chain having a nominal pitch of "X" inches; a beam track having a nominal height of X+1 inches; trolleys having nominal X+1 inch wheel diameter riding on said track and attached to said driven conveyor chain; and said driven conveyor chain having a maximum allowable chain pull value which is equal to or greater than the maximum allowable chain pull value for a chain having a nominal pitch of X+1 inches; plural synchronized drives being used to drive said driven chain, the number used being that which would be used for a driven chain of X+1 inch nominal pitch having the same overall length of said driven chain; said nominal pitch being 2 inch, said beam and trolley being nominal 3 inch, and said trolleys being connected to said chain at 8 inch intervals.

5. The overhead conveyor of claim 4 in which said side links and center links are joined by ½ inch diameter pins.

6. The overhead conveyor of claim 4 in which said nominal pitch is 3 inch and said center links are joined by ⅝ inch diameter pins.

7. The overhead conveyor of claim 4 in which said nominal pitch is 4 inch and said center links are joined by ⅞ inch diameter pins.

8. The overhead conveyor of claim 4 in which said nominal pitch is 3 inch, and said side links and said center links are joined by ⅝ inch diameter pins.

9. The overhead conveyor of claim 4 in which said nominal itch is 4 inch, and said side links and said center links are joined by ⅞ inch diameter pins.

10. An overhead conveyor comprising: a driven conveyor chain having a nominal pitch of "X" inches; a beam track having a nominal height of X+1 inches; trolleys having nominal X+1 inch wheel diameter riding on said track and attached to said driven conveyor chain; and said driven conveyor chain having a maximum allowable chain Pull value which is equal to or greater than the maximum allowable chain Pull value for a chain having a nominal pitch of X+1 inches; said nominal pitch being 2 inch, and said side links and center links are joined by ½ inch diameter pins.

11. A method of constructing an overhead conveyor comprising: providing a driven conveyor chain having a nominal pitch of "X" inches, having a maximum allowable chain pull value which is equal to or greater than the maximum allowable chain pull value for a chain having a nominal pitch of X+1 inches; providing a beam track having a nominal height of X+1 inches; mounting trolleys having nominal X+1 inch wheel diameter to ride on said track and attaching said trolleys to said driven conveyor chain; plural synchronized drives being used to drive said driven chain, the number used being that which would be used for a driven chain of X+1 inch nominal pitch having the same overall length of said driven chain, said nominal pitch being 2 inch, said beam and trolley being nominal 3 inch, and said trolleys being connected to said chain at 8 inch intervals.

\* \* \* \* \*